United States Patent [19]

Becker et al.

[11] Patent Number: 4,798,432
[45] Date of Patent: Jan. 17, 1989

[54] STORAGE CONTAINER FOR A SECTION OF A LIGHT CONDUCTING FIBRE

[75] Inventors: Johann A. Becker, Overath; Detlef M. Boehm, Neunkirchen-Seelscheid, both of Fed. Rep. of Germany

[73] Assignee: U.S. Philips Corp., New York, N.Y.

[21] Appl. No.: 905,220

[22] Filed: Sep. 8, 1986

[30] Foreign Application Priority Data

Sep. 11, 1985 [DE] Fed. Rep. of Germany ....... 3532313

[51] Int. Cl.⁴ .............................................. G02B 6/36
[52] U.S. Cl. .................................................. 350/96.20
[58] Field of Search ............... 350/96.15, 96.20, 96.21, 350/96.22, 96.23

[56] References Cited

U.S. PATENT DOCUMENTS

| 4,332,435 | 6/1982 | Post | 350/96.20 |
| 4,500,166 | 2/1985 | Kunze | 350/96.20 |
| 4,666,240 | 5/1987 | Caron et al. | 350/96.20 |
| 4,685,764 | 8/1987 | Hoffer et al. | 350/96.20 |

FOREIGN PATENT DOCUMENTS

| 55-45053 | 3/1980 | Japan | 350/96.21 |
| 57-129405 | 8/1982 | Japan | 350/96.20 |
| 58-50508 | 3/1983 | Japan | 350/96.20 |

Primary Examiner—John D. Lee
Attorney, Agent, or Firm—William L. Botjer

[57] ABSTRACT

A storage container for a section of a light fibre. A flat storage space is provided, whose height is slightly greater than the thickness of the fibre and out of which the ends of the fibre can be pulled to the desired length through openings in the outer peripheral wall. Fairly large spare lengths of a fibre are accommodated in it in orderly fashion and removed in a simple manner at any time. The design is such that the storage container comprises a fixed outer part (10) supporting the outer peripheral walls and a winding part (11, 24) rotatable therein. The central part of the connecting line (1) is led through the winding part (11, 24) along supporting surfaces in an S shape in the winding plane. The ends of the fibre are led with free play through an opening in the outer peripheral wall of the outer part (10). Rotation of the winding part (11, 24), winds the fibre onto or from the peripheral surface of the winding part (11, 24).

12 Claims, 3 Drawing Sheets

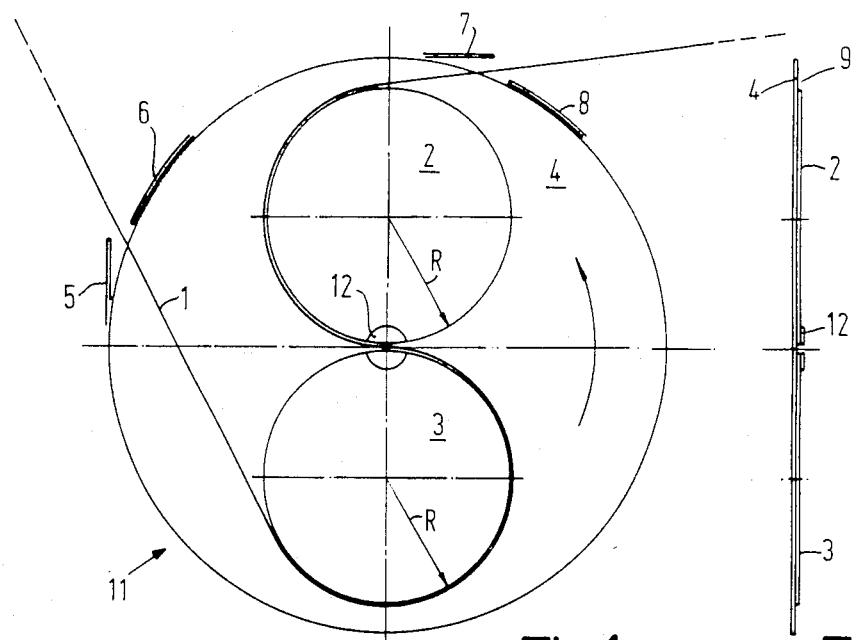
Fig.1    Fig.2
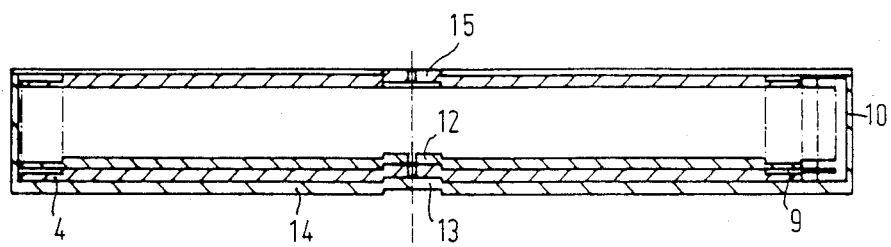
Fig.3
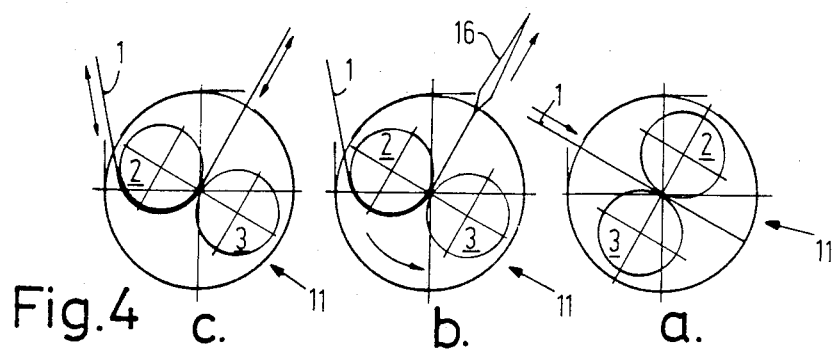
Fig.4  c.   b.   a.

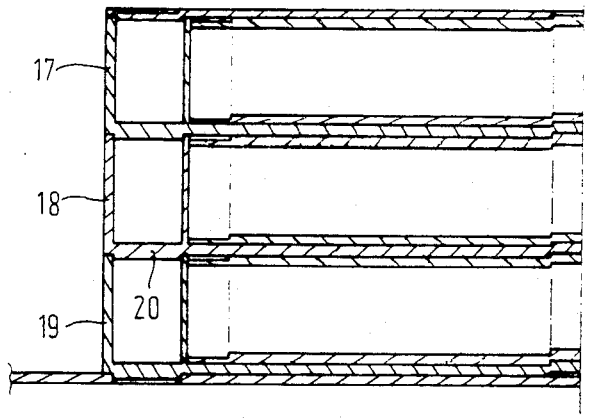
Fig.6
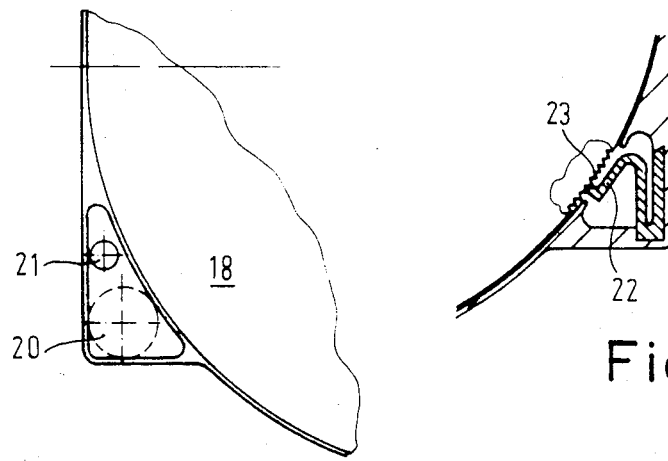
Fig.7
Fig.8
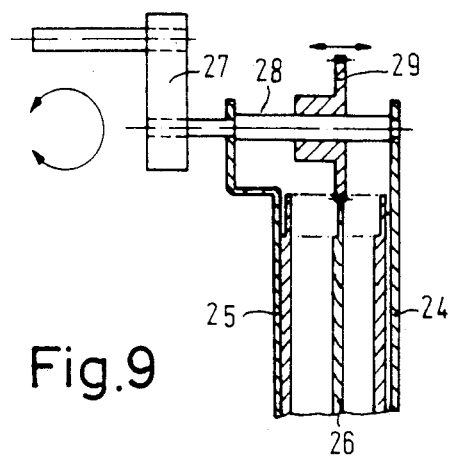
Fig.9
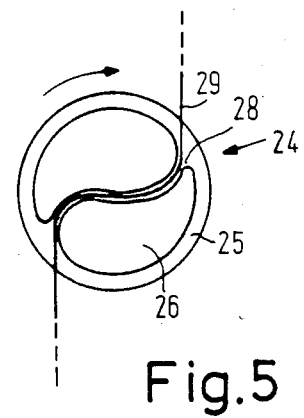
Fig.5

STORAGE CONTAINER FOR A SECTION OF A LIGHT CONDUCTING FIBRE

The invention relates to a storage container for a section of a light conducting fibre. Specifically, a flat storage space is provided, whose height is slightly greater than the thickness of the fibre and from which the ends of the fibre can be pulled out to the desired length through openings in the outer peripheral wall.

A storage container of this kind is known from DE-OS No. 31 18 173. In it can be stored at any given time a spare length of the end sections of the light conducting fibres of an optical cable which might be needed for the making of a spliced connection.

If in the event of cable branching the individual fibres of different optical cables have to be connected to each other on different paths of differing lengths, it is useful to have connecting lines, each of which consists of a limited length of a single fibre and can be inserted between the ends of the fibres of the optical cables to be connected. These connecting lines have to be relatively long since considerable distances have also to be spanned. Excess lengths which are no longer required have to be stored after splicing operations or the fitting of connected elements. In the event of subsequent modifications to connections a spare length has to be available again. The known storage container does not meet this requirement.

SUMMARY OF THE INVENTION

It is an object of the invention to provide a storage container of the kind mentioned in the preamble, in which relatively large spare lengths of single-fibre optical line can be stored and from which such lengths can be removed in a simple manner at any time.

The invention is characterized in that the storage container comprises a fixed outer part bearing the outer peripheral walls and a winding part rotatable therein, the central portion of the fibre being led through the winding part along support surfaces in an S shape in the winding plane. The ends of the fibre are brought outside with free play through an opening in the outer peripheral wall of the outer part. It is possible, by rotation of the winding part, to wind the fibre onto and from the peripheral surface of the winding part.

The ends of the connecting line can be simultaneously pushed into and pulled out of the storage container by a single winding operation. Jamming or kinking of the connecting line inside the take-up container is impossible.

It is an advantage if the winding part comprises flat elevations in the central area of a circular turntable.

A preferred embodiment is characterized in that the winding part comprises a cylindrical disc-shaped central elevation with an S-shaped carrier groove extending between approximately diagonally opposite starting-points for the take-up of the central portion of the fibre.

The minimum permissible bending radius for light conducting fibres will be adhered to if the radii of curvature of the surfaces of the S-shaped carrier groove against which the fibre bears are greater than 20 mm.

In a preferred embodiment the winding part comprises two adjacent cylindrical disc-shaped elevated blocks, whose diameters are greater than 40 mm, said blocks being separated by a space through which the fibre is led.

To enable the winding part to be turned from the outside, its circular turntable preferably comprises a peripheral toothing which is accessible through gaps in the peripheral wall of the outer part.

A further preferred embodiment of the invention is characterized in that several winding parts are arranged in a common outer part and form a cassette with the latter. A further advantage can be gained if a plurality of cassettes are arranged coaxially one above the other and are connected to each other by positive engagement with each other. A plurality of individually manipulable connecting lines can thus be accommodated in a space-saving manner.

On account of the shallowness of the individual stacked winding parts, the individual turntables can to advantage be turned with a drive element which can be brought into engagement selectively with them.

A preferred embodiment is characterized in that a cassette or a group of stacked cassettes is associated with a turning device comprising a pinion which can be brought into engagement in various height positions with the toothing of one of the turntable and whose shaft can be driven via a hand crank. It is also possible to have the pinion mesh with a primary toothed wheel with a substantially larger number of teeth, which wheel can be driven by means of a hand crank.

The insertion of a smaller gearwheel between a larger primary gearwheel and the toothing of the turntable yields a favourable gear ratio without making it necessary to leave too large a gap open in the peripheral wall of the housing of a cassette.

A useful embodiment is characterized in that the pinion is fitted outside the circumferential area of the turntables on a shaft which is fixed in relation to the housing of a cassette or a group of cassettes in such a way that the pinion cannot turn relative to the shaft but is slidable along the shaft with a certain effort. It is, however, also possible for the pinion to be a part of a turning device which can be fastened to the housing of a cassette or a group of cassettes at various heights. In the latter case it would not be necessary to allocate each group of storage containers its own drive but the latter could be fitted as a service device.

The invention will now be explained in detail with the aid of a description of advantageous embodiments shown in the drawing.

BRIEF DESCRIPTION OF THE FIGURES

FIG. 1 shows a top view of a winding part for a storage container according to the invention.

FIG. 2 shows a cross-section through the arrangement in FIG. 1.

FIG. 3 shows a cross-section through a cassette with several storage containers.

FIG. 4 shows phases a, b, and c of the lateral threading of a connecting line into a storage container as shown in FIG. 3.

FIG. 5 shows a modified version of a winding part.

FIG. 6 shows a cross-section through three stacked cassettes.

FIG. 7 shows a partial top view of a fastening section of a stackable cassette.

FIG. 8 shows a possibility for the prevention, by ratcheting, of rotary movement of a winding part.

FIG. 9 shows a partial section through a group of storage containers with a drive device permanently asociated with it.

DESCRIPTION OF THE PREFERRED EMBODIMENT

Figure 10:
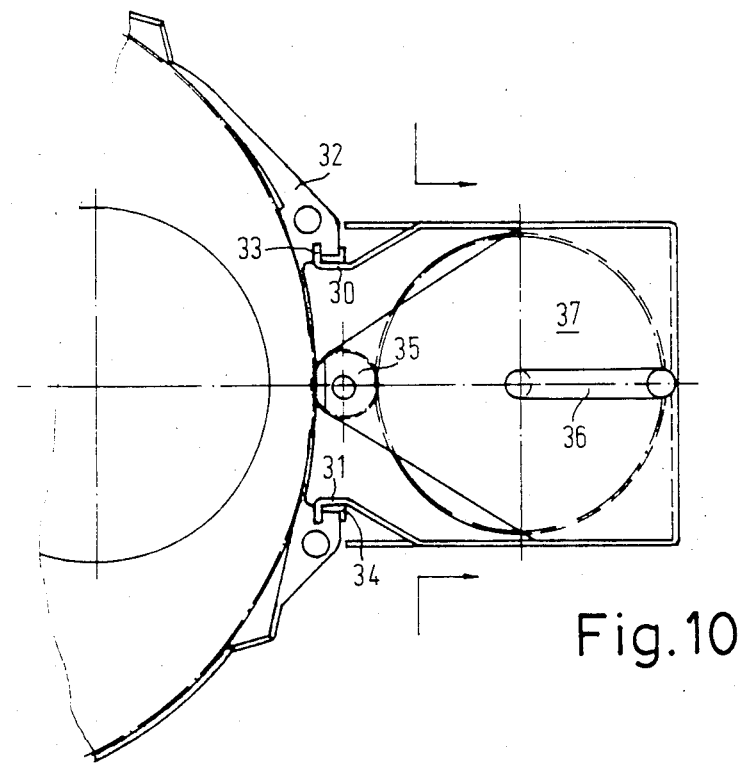
FIG. 10 shows a drive device which can be applied to a group of storage containers so as to be longitudinally displaceable.

The storage container shown in FIGS. 1 and 2 for the connecting line 1 has a winding part 11 comprising two flat cylindrical elevation blocks 2 and 3 which are fitted on a turntable 4 and have, for example, a diameter of 2 R=60 mm. Of the fixed outside part, in which the winding part 11 is rotatably mounted, only sections 5 and 6 and 7 and 8 of the peripheral walls are shown, between which in each case peripheral gaps are formed for the lead-out of the ends of the connecting line 1. A plurality of turns of the connecting line 1 are wound around the elevated blocks 2 and 3 between the turntable 4 and a cover plate, not shown.

It, as shown in FIG. 3, two or more winding parts are stacked upon each other within a common cassette housing 10, which forms a common peripheral wall for all the winding parts, the turntable 4 of the next winding part above acts as a cover plate.

The individual winding parts are placed on central bearing protrusions 12 which are divided in two parts for the purpose of leading through the connecting line 1, and which project axially over the elevations 2 and 3 and engage in corresponding central recesses in an adjacent turntable 4. A fixed bearing protrusion 13 is fitted to the base plate 14 of the cassette housing 10. A fixed recess for the guidance of the bearing protrusion 15 of the last winding part has correspondingly to be provided in a cover plate, not shown.

With reference to the phase diagrams shown in FIG. 4 it will now be explained how a connecting line 1 can be threaded into the storage space 9 of the winding part 11 of a cassette 10. First, as illustrated in phase a, one end of the connecting line 1 is pushed through a peripheral opening in cassette housing 10, through the gap between two elevations 2 and 3 to the opposite peripheral wall. Then the winding part 11 is turned into the position identifiable in phase b with simultaneous pushing-on on of the connecting line 1, until the end of the connecting line is visible in front of the second peripheral opening in the cassette housing 10. There it can be gripped with the pincers 16 and pulled out as shown in phase c, until approximately the same legnth of connecting line 1 protrudes from both peripheral openings in the cassette housing 10. Both ends can then be drawn in by turning the winding part 11 and wound around the elevations 2 and 3.

FIG. 5 shows an alternative embodiment of the winding part 24 on whose turntable 28 a basically cylindrical disc-shaped elevation 26 is provided, through which an S-shaped groove 28 runs for the lead-through of the connecting line 29. The radii of the bearing surfaces of the groove 28 for the connecting line 29 should be larger than 20 mm and preferably 30 mm so that the minimum bending radius of a light conducting fibre will certainly be respected. In the version according to FIG. 5 the average length of a turn will preferably be greater than that in FIG. 1. On the other hand, there is the disadvantage that winding-up of the connecting line 29 is only permitted in one direction of rotation of the winding part 24, because excessively small bending radii would result in the opposite direction of rotation.

As shown in FIG. 6, a plurality of cassettes of the kind shown in FIG. 3 can be stacked one above the other. They all have identical cassette housings 17, 18 and 19, which by means of centering protrusions 20 arranged radially on the outside of their bottom walls fit into corresponding recesses in the top wall of the cassette underneath. A group of cassette housings 17, 18 and 19 can be held together by means of screws inserted through drilled passages 21 (FIG. 7).

Each individual winding part is associated with a ratchet element 22 as illustrated in FIG. 8, which engages resiliently in the outer toothing 23 of each turntable 4, so that turning is only possible in the event of a minimum torque being exceeded which is greater than the moments of friction acting between adjacent turntables. Simultaneous turning of the adjacent turntables can not result during intentional turning of one turntable.

In practice it must be possible to pull every individual connecting line separately from a cassette or from a group of cassettes. Because of the small dimensions a manual operation is difficult. Turning devices are therefore to b recommended which permit an optional selective drive of every individual winding part.

The turning device shown in FIG. 9 is permanently associated with a group of winding parts between a bottom plate 24 and a top plate 25. A shaft 28 which can be turned via a hand crank 27 is set in shoulders on the bottom plate 24 and the top plate 25. On this shaft a pinion 29 is fitted in such a way that it cannot turn relative to the shaft but can be slid along the shaft against an increased frictional force so that it can be brought into engagement with each of the winding parts 26.

Figure 11:
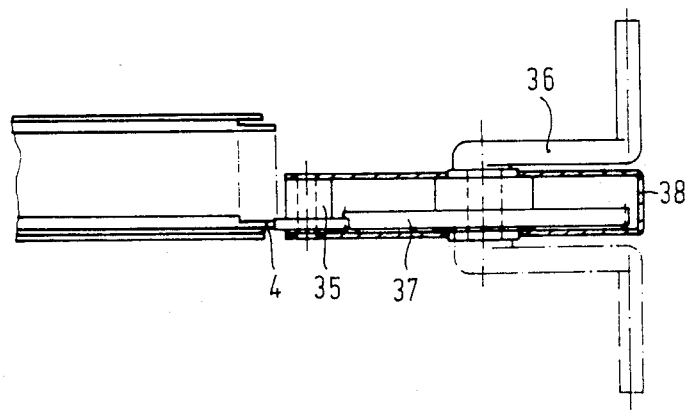
FIG. 11 shows a side view of the arrangement illustrated in FIG. 10.

The turning device shown in FIGS. 10 and 11 can be fitted as a service element. It has two resilient clamps 30 and 31 which can be bent towards each other and whose angled ends 33 engage in corresponding grooves in a cassette housing 32. The correct height of the driving device is set and secured with studs 34 on the resilient clamps 30 and 31, which engage in corresponding grooves in the cassette housing 32. In this position the pinion 35 engages with the teeth of one of the turntables 4 and is driven by the hand crank 36 via the larger primary gearwheel 37, which is rotatably fitted in the housing 38 of the driving device. The pinion 35 is small and necessitates only a correspondingly small recess in the peripheral surface of the cassette housing 32. Because of the large transmission ratio between the primary gearwheel 37 and the pinion 35, however, few turns are necessary in order to wind up a connecting line.

The symmetrical design of the fastening elements 30, 31 and 34 makes it possible to fit the turning device turned through 180°. Similarly, the hand cranks can be fitted on either side of the primary gearwheel. The turning device can therefore be fitted in the appropriate position depending on whether there is room for it above or below the cassette.

What is claimed is:
1. A storage container for a section of a light conducting fibre comprising:
   a winding part in the form of a circular turntable supported for rotation, said winding part including an S-shaped winding surface for supporting said light conducting fibre and a peripheral toothed edge; and a flat storage housing having a width greater than the thickness of said light conducting fibre, enclosing said winding part, said storage housing having first, second and third openings, said toothed edge of said turntable being accessible through said third opening, said conducting fibre extending through said first opening about said S-shaped winding surface and then through said second opening, whereby rotation of said winding part winds said light conducting fibre about said S-shaped winding surface retracting ends of said light conducting fibre into said storage housing.

2. A storage container as claimed in claim 1, wherein the winding part comprises flat elevations in the central area of a circular turntable.

3. A storage container as claimed in claim 2, wherein the winding part comprises two adjacent cylindrical disc-shaped elevated blocks whose diameters (2 R) are greater than 40 mm, said blocks being separated by a space, through which the fibre is led.

4. A storage container as claimed in claim 1, wherein the winding part comprises a cylindrical disc-shaped central elevation with an S-shaped carrier groove extending between approximately diagonally opposite starting points adjacent said first and second openings for the take-up of the fibre.

5. A storage container as claimed in claim 4, wherein the radii of curvature R of the surfaces comprises the S-shaped carrier against which the fibre bearings are greater than 20 mm.

6. A storage container as claimed in claim 1 further including a braking device provided between the toothed edge and said housing.

7. A storage container as claimed in claim 1, including more than one winding part arranged in said flat storage housing.

8. The storage container of claim 1 further comprising a second identical winding part, said winding parts having a common axis of rotation, and a second storage housing identical to said first housing and fastened thereto, containing said second winding part and fastened to said first housing.

9. The storage container of claim 8 further comprising:
 a toothed edge around the periphery of each winding part;
 a pinion for meshing with teeth of one of said winding parts;
 means for positioning said pinion in engagement to a tooth edge of one of said winding parts through a third opening in said storage housing; and
 a handle coupled to said pinion for rotating said engaged toothed winding part.

10. The storage container of claim 9 further comprising a primary toothed wheel coupled between said handle and said pinion.

11. The storage container of claim 9 wherein said means for positioning said pinion comprises a rotatable shaft fixed to said storage housing supporting said pinion for axial movement along said shaft in response to an applied minimum force, and restricting rotation of said pinion, said shaft extending over each toothed edge to permit selective engagement of said pinion with one toothed edge.

12. The storage container of claim 9 wherein said means for positioning comprises a turning device housing which may be coupled to each storage housing at a position opposite each toothed edge, said turning device supporting said pinion for engagement with a selected toothed edge of a winding part.

* * * * *